(12) United States Patent
Oliver et al.

(10) Patent No.: US 12,130,053 B2
(45) Date of Patent: Oct. 29, 2024

(54) HYBRID TANK AND TANKLESS WATER HEATING SYSTEM

(71) Applicant: Rinnai America Corporation, Peachtree City, GA (US)

(72) Inventors: Jason Oliver, Peachtree City, GA (US); Michael Scott Knoblett, Peachtree City, GA (US); Floris van Dijk BsC., Doesburg (NL); Jason William Siler, Sharpsburg, GA (US)

(73) Assignee: Rinnai America Corporation, Peachtree City, GA (US)

( * ) Notice: Subject to any disclaimer, the term of this patent is extended or adjusted under 35 U.S.C. 154(b) by 4 days.

(21) Appl. No.: 17/821,301

(22) Filed: Aug. 22, 2022

(65) Prior Publication Data

US 2022/0397303 A1    Dec. 15, 2022

Related U.S. Application Data (63) Continuation of application No. 17/162,851, filed on Jan. 29, 2021, now Pat. No. 11,421,915.
(Continued)

(51) Int. Cl.
*F24H 9/00*    (2022.01)
*F23L 15/04*    (2006.01)
(Continued)

(52) U.S. Cl.
CPC ............ *F24H 9/0084* (2013.01); *F23L 15/04* (2013.01); *F24H 1/205* (2013.01); *F24H 9/2035* (2013.01);
(Continued)

(58) Field of Classification Search
CPC . E04H 12/28; F23L 11/00; F23L 13/06; F23L 15/04; F24H 1/205; F24H 1/282;
(Continued)

(56) References Cited

U.S. PATENT DOCUMENTS

| 1,966,620 A | 7/1934 | Fluor |
| 2,718,841 A | 9/1955 | Alan |

(Continued)

FOREIGN PATENT DOCUMENTS

| AU | 2009201356 | 10/2010 |
| CA | 1295899 | 2/1992 |

(Continued)

OTHER PUBLICATIONS

Ubbink, Rolux Condensing Vent System, Installation Instructions. 12 pages.

(Continued)

*Primary Examiner* — Gregory A Wilson
(74) *Attorney, Agent, or Firm* — Quinn IP Law (57) ABSTRACT

A vent attachment facilitates attaching a coaxial air intake and exhaust vent of a tankless water heater to a Category I vent, such as B-vent. The vent attachment comprises a first end with a coaxial connector comprising a central exhaust pathway and a circumferential air intake pathway. The vent attachment also comprises a second end with a tubular exhaust vent connector in fluid communication with the central exhaust pathway. The vent attachment further comprises a frame that encloses the central exhaust pathway and comprises a mesh configured to provide fluid communication through the frame with the air intake pathway. Additionally, operation of the tankless water heater is modified to ensure that the exhaust generated is suitable for venting through a Category I vent. The tankless water heater maintains a high fuel consumption rate such that the temperature of hot water produced increases throughout each of a plurality of burner stages.

5 Claims, 6 Drawing Sheets

Related U.S. Application Data (60) Provisional application No. 62/968,842, filed on Jan. 31, 2020.

(51) Int. Cl.
  *F24H 1/20* (2022.01)
  *F24H 9/20* (2022.01)
  *F24H 15/174* (2022.01)
  *F24H 15/219* (2022.01)
  *F24H 15/223* (2022.01)
  *F24H 15/365* (2022.01)

(52) U.S. Cl.
  CPC ......... *F24H 15/174* (2022.01); *F24H 15/219* (2022.01); *F24H 15/223* (2022.01); *F24H 15/365* (2022.01)

(58) Field of Classification Search
  CPC .... F24H 9/0084; F24H 15/174; F24H 15/223; F22B 27/00; F22B 35/005; F22B 37/06; F22B 7/18; F24F 7/00; E04C 2/523
  See application file for complete search history.

(56) References Cited

U.S. PATENT DOCUMENTS

| | | | |
|---|---|---|---|
| 2,811,095 A | 10/1957 | Moran | |
| 2,863,442 A | 12/1958 | Moran | |
| 3,211,373 A | 10/1965 | Miller | |
| 3,866,950 A | 2/1975 | Skoch et al. | |
| 4,360,336 A | 11/1982 | Shepherd | |
| 4,442,798 A | 4/1984 | Zanias | |
| 4,608,963 A | 9/1986 | Townsend et al. | |
| 4,736,730 A | 4/1988 | Robertson | |
| 4,819,587 A | 4/1989 | Tsutsui et al. | |
| RE33,082 E | 10/1989 | Gerstmann et al. | |
| 4,909,227 A | 3/1990 | Rieger | |
| 4,925,093 A | 5/1990 | Moore et al. | |
| 4,940,042 A * | 7/1990 | Moore, Jr. | F23L 17/04 122/18.31 |
| 5,012,793 A * | 5/1991 | Guzorek | F23J 13/025 126/307 R |
| 5,165,732 A | 11/1992 | Townsend | |
| 5,199,385 A | 4/1993 | Doss | |
| 5,393,260 A | 2/1995 | Barth | |
| 5,443,206 A | 8/1995 | Cohen | |
| 5,464,006 A | 11/1995 | Ledjeff et al. | |
| 5,548,277 A | 8/1996 | Wild | |
| 5,605,452 A | 2/1997 | Robertson et al. | |
| 5,626,287 A | 5/1997 | Krause et al. | |
| 5,647,340 A | 7/1997 | Shimek et al. | |
| 5,655,710 A | 8/1997 | Kayahara et al. | |
| 5,709,174 A | 1/1998 | Ledjeff et al. | |
| 5,797,358 A | 8/1998 | Brandt et al. | |
| 5,829,962 A | 11/1998 | Van Drasek et al. | |
| 5,866,880 A | 2/1999 | Seitz et al. | |
| 5,997,280 A | 12/1999 | Welz et al. | |
| 6,076,862 A | 6/2000 | Barth et al. | |
| 6,080,791 A | 6/2000 | Seitz et al. | |
| 6,216,685 B1 | 4/2001 | Payne et al. | |
| 6,234,163 B1 | 4/2001 | Payne | |
| 6,247,919 B1 | 6/2001 | Welz et al. | |
| 6,543,437 B1 * | 4/2003 | Luu | F23L 17/04 126/307 R |
| 6,647,977 B2 * | 11/2003 | Lesage | F23L 17/04 126/307 R |
| 6,994,622 B2 * | 2/2006 | Koessler | F24F 7/02 454/367 |
| 7,020,387 B1 | 3/2006 | Andrakin | |
| 7,074,121 B2 * | 7/2006 | Zhou | F23L 17/14 454/8 |
| 7,298,968 B1 | 11/2007 | Boros et al. | |
| 7,506,617 B2 | 3/2009 | Paine | |
| 7,866,168 B2 * | 1/2011 | Gordon | F24H 4/04 62/238.7 |
| 8,113,154 B2 * | 2/2012 | Syler | F23J 13/025 122/155.1 |
| 8,165,461 B2 | 4/2012 | Sullivan | |
| 8,175,752 B2 | 5/2012 | Deivasigamani et al. | |
| 8,186,312 B2 | 5/2012 | Paine | |
| 8,186,313 B2 | 5/2012 | Paine | |
| 8,271,143 B2 | 9/2012 | Deivasigamani et al. | |
| 8,333,584 B2 | 12/2012 | Cook | |
| 8,498,523 B2 | 7/2013 | Deivasigamani et al. | |
| 8,552,574 B2 * | 10/2013 | Sasaki | F23J 13/025 290/1 A |
| 8,768,154 B2 | 7/2014 | Nakagawa et al. | |
| 8,787,742 B2 | 7/2014 | Lutz et al. | |
| 8,956,152 B2 | 2/2015 | Cook | |
| 8,965,584 B2 | 2/2015 | Deivasigamani et al. | |
| 8,971,694 B2 | 3/2015 | Deivasigamani et al. | |
| 9,002,185 B2 | 4/2015 | Kreutzman | |
| 9,062,895 B2 | 6/2015 | Deivasigamani et al. | |
| 9,097,431 B2 | 8/2015 | Paine | |
| 9,097,436 B1 | 8/2015 | Smelcer et al. | |
| 9,103,562 B2 | 8/2015 | Nakagawa et al. | |
| 9,140,450 B2 * | 9/2015 | Jacklich | F23J 13/025 |
| 9,222,696 B2 * | 12/2015 | Lesage | F24H 9/06 |
| 9,234,679 B2 | 1/2016 | Deivasigamani et al. | |
| 9,335,066 B2 | 5/2016 | Humphrey et al. | |
| 9,464,805 B2 | 10/2016 | Smelcer et al. | |
| 9,909,780 B2 * | 3/2018 | Humphrey | F24H 9/2021 |
| 10,208,953 B2 | 2/2019 | Smelcer et al. | |
| 10,247,446 B2 | 4/2019 | Paine | |
| 10,254,008 B2 | 4/2019 | Thompson | |
| 10,760,823 B2 * | 9/2020 | Knoblett | F24D 19/1051 |
| 2001/0009609 A1 | 7/2001 | Bradenbaugh | |
| 2002/0092518 A1 | 7/2002 | Maiello | |
| 2002/0146241 A1 | 10/2002 | Murahashi et al. | |
| 2004/0103854 A1 | 6/2004 | Cui et al. | |
| 2004/0191712 A1 | 9/2004 | Thomson et al. | |
| 2005/0185942 A1 | 8/2005 | Fabrizio | |
| 2005/0230490 A1 | 10/2005 | Pouchak et al. | |
| 2005/0230491 A1 | 10/2005 | Pouchak et al. | |
| 2006/0153550 A1 | 7/2006 | Cohen | |
| 2007/0084420 A1 | 4/2007 | Boros et al. | |
| 2008/0152331 A1 | 6/2008 | Ryks | |
| 2008/0197205 A1 | 8/2008 | Ene et al. | |
| 2008/0216770 A1 | 9/2008 | Humphrey et al. | |
| 2008/0216771 A1 | 9/2008 | Paine | |
| 2008/0285964 A1 | 11/2008 | Sullivan | |
| 2009/0012976 A1 | 5/2009 | Cabrera | |
| 2009/0180768 A1 | 7/2009 | Moore et al. | |
| 2009/0211644 A1 | 8/2009 | Wylie et al. | |
| 2010/0031953 A1 | 2/2010 | Penev et al. | |
| 2010/0111508 A1 | 5/2010 | Ding et al. | |
| 2010/0195991 A1 | 8/2010 | Deivasigamani et al. | |
| 2010/0282440 A1 | 11/2010 | Trihey et al. | |
| 2011/0218683 A1 | 9/2011 | Ben-Yaacov et al. | |
| 2011/0305444 A1 | 12/2011 | Pussell | |
| 2011/0309155 A1 | 12/2011 | Thomson et al. | |
| 2012/0060827 A1 * | 3/2012 | Roetker | F24H 15/345 126/714 |
| 2012/0090560 A1 | 4/2012 | Iwama et al. | |
| 2012/0090598 A1 | 4/2012 | Ru et al. | |
| 2012/0193911 A1 | 8/2012 | Sasaki et al. | |
| 2012/0325337 A1 | 12/2012 | Nakagawa et al. | |
| 2013/0034344 A1 | 2/2013 | Lutz et al. | |
| 2013/0042635 A1 * | 2/2013 | Nelson | F24H 15/223 62/238.7 |
| 2013/0051777 A1 | 2/2013 | Brian et al. | |
| 2013/0263843 A1 | 10/2013 | Kreutzman | |
| 2013/0266300 A1 * | 10/2013 | Kreutzman | F24H 9/2021 392/501 |
| 2014/0023352 A1 | 1/2014 | Jurczyszak et al. | |
| 2014/0124587 A1 | 5/2014 | Caruso | |
| 2014/0137591 A1 | 5/2014 | Rutherford | |
| 2014/0162195 A1 | 6/2014 | Lee et al. | |
| 2015/0000300 A1 | 1/2015 | Zhang et al. | |
| 2015/0037744 A1 | 2/2015 | Semiller et al. | |
| 2015/0047578 A1 | 2/2015 | Lesage | |
| 2015/0122134 A1 | 5/2015 | Moro et al. | |
| 2015/0153047 A1 | 6/2015 | Moro et al. | |
| 2015/0204550 A1 | 7/2015 | Deivasigamani et al. | |

(56) References Cited

U.S. PATENT DOCUMENTS

| | | | |
|---|---|---|---|
| 2016/0003468 A1 | 1/2016 | Malone et al. | |
| 2016/0060873 A1* | 3/2016 | Sugatani | F23J 11/00 |
| | | | 29/401.1 |
| 2016/0061462 A1 | 3/2016 | Lowrimore et al. | |
| 2016/0178234 A1* | 6/2016 | Hayden | F24H 1/08 |
| | | | 392/486 |
| 2016/0265810 A1 | 9/2016 | Humphrey et al. | |
| 2018/0195763 A1 | 7/2018 | Sarkis | |
| 2018/0224156 A1 | 8/2018 | Steinhafel et al. | |
| 2018/0372376 A1 | 12/2018 | Cartmill et al. | |
| 2019/0086121 A1 | 3/2019 | Branecky et al. | |
| 2019/0264949 A1 | 8/2019 | Yin et al. | |
| 2019/0285316 A1 | 9/2019 | Paine | |
| 2021/0239360 A1* | 8/2021 | Oliver | F23L 15/04 |

FOREIGN PATENT DOCUMENTS

| | | |
|---|---|---|
| CA | 2115174 | 5/1994 |
| CA | 2829601 | 4/2015 |
| CN | 107192122 | 9/2017 |
| CN | 107816796 | 3/2018 |
| DE | 9105119 | 3/1993 |
| DE | 20205867 U1 | 7/2002 |
| EP | 1475577 | 11/2004 |
| EP | 1450101 B1 | 7/2009 |
| EP | 1860385 | 7/2018 |
| EP | 2378197 B1 | 3/2019 |
| FI | 122451 B | 1/2012 |
| FR | 1254274 | 11/2013 |
| FR | 2990496 | 5/2014 |
| GB | 709276 | 5/1954 |
| GB | 2340594 | 2/2000 |
| GB | 2364114 | 6/2002 |
| JP | 58120043 | 7/1983 |
| JP | 58123041 | 7/1983 |
| KR | 101259763 B1 | 5/2013 |
| SE | 534083 C2 | 4/2011 |
| WO | 2008070906 | 6/2008 |
| WO | 2010096858 | 9/2010 |
| WO | 2011124756 | 10/2011 |
| WO | 2011146962 | 12/2011 |
| WO | 12143598 | 10/2012 |
| WO | 2013105792 | 7/2013 |
| WO | 2018018977 | 2/2018 |

OTHER PUBLICATIONS

Hoke, Rich, Venting of Category IV Appliances (High Efficiency Furnaces), Service Application Manual, SAM Chapter 630-152, Section 12, RSES, The HVACR Training Authority. 8 pages.

* cited by examiner

HYBRID TANK AND TANKLESS WATER HEATING SYSTEM

BACKGROUND

The need for heated fluids, and heated water, has long been recognized. Conventionally, water has been heated by water heaters containing heating elements. These water heaters are conventionally heated either electrically or with gas burners, where the heated water may be stored in a tank or reservoir. Additionally, such water heaters may be tankless, circulating hot water into a plumbing system without storing the water in a tank or reservoir. Water heaters are often used in private and commercial plumbing networks. Plumbing networks often require water to be continuously circulated into a heater to maintain a desired water temperature in hot-water supply lines.

Tankless water heaters provide for improved efficiency in comparison to traditional tank water heaters. In an effort to further facilitate efficient operations, many tankless water heaters have Category III or IV vent systems. However, many existing buildings and other structures have Category I vents, typically B-vent, leading to increased installation time and costs for adoption of a tankless water heater.

SUMMARY

A first aspect of the disclosure provides a vent attachment for a tankless water heater. The vent attachment comprises a first end with a coaxial connector adapted to connect to a coaxial air intake and exhaust vent of the tankless water heater. The coaxial connector comprises a central exhaust pathway and a circumferential air intake pathway. The vent attachment comprises a second end with a tubular exhaust vent connector in fluid communication with the central exhaust pathway. The vent attachment comprises a frame that encloses the central exhaust pathway and comprises a mesh configured to provide fluid communication through the frame with the air intake pathway.

In some implementations of the first aspect of the disclosure, the central exhaust pathway has a 3 inch diameter and the circumferential air intake pathway has a 5 inch diameter.

In some implementations of the first aspect of the disclosure, the tubular exhaust vent connector has a larger diameter than the central exhaust pathway.

In some implementations of the first aspect of the disclosure, the central exhaust pathway has a 3 inch diameter and the tubular exhaust vent connector has a 6 inch diameter.

In some implementations of the first aspect of the disclosure, the exhaust vent connector is sized to be received by a Category I vent.

In some implementations of the first aspect of the disclosure, the Category I vent is B-vent.

In some implementations of the first aspect of the disclosure, the exhaust vent connector terminates with a flange.

In some implementations of the first aspect of the disclosure, the mesh is #30 mesh.

A second aspect of the disclosure provides a hybrid tank and tankless water heating system. The system comprises a tankless water heater configured to produce hot water. The tankless water heater comprising a coaxial air intake and exhaust vent. The system comprises a hot water storage tank in fluid communication with the tankless water heater and configured to receive the hot water produced by the tankless water heater. The system comprises a vent attachment. The vent attachment comprises a first end with a coaxial connector adapted to connect to the coaxial air intake and exhaust vent of the tankless water heater. The coaxial connector comprises a central exhaust pathway and a circumferential air intake pathway. The vent attachment comprises a second end with a tubular exhaust vent connector in fluid communication with the central exhaust pathway. The vent attachment comprises a frame that encloses the central exhaust pathway and comprises a mesh configured to provide fluid communication through the frame with the air intake pathway.

In some implementations of the second aspect of the disclosure, the central exhaust pathway has a 3 inch diameter and the circumferential air intake pathway has a 5 inch diameter.

In some implementations of the second aspect of the disclosure, the tubular exhaust vent connector has a larger diameter than the central exhaust pathway.

In some implementations of the second aspect of the disclosure, the central exhaust pathway has a 3 inch diameter and the tubular exhaust vent connector has a 6 inch diameter.

In some implementations of the second aspect of the disclosure, the exhaust vent connector is sized to be received by a Category I vent.

In some implementations of the second aspect of the disclosure, the Category I vent is B-vent.

In some implementations of the second aspect of the disclosure, the exhaust vent connector terminates with a flange.

In some implementations of the second aspect of the disclosure, the mesh is #30 mesh.

In some implementations of the second aspect of the disclosure, the tankless water heater is configured to produce the hot water with Category I operation.

In some implementations of the second aspect of the disclosure, the tankless water heater is configured to produce the hot water to within +/-1-10 degrees of a set point temperature.

In some implementations of the second aspect of the disclosure, the system further comprises a controller configured to control a fuel consumption rate of one or more burners of the tankless water heater though a plurality of burner stages as a temperature of hot water stored in the hot water storage tank increases. Each of the burner stages operates the one or more burners at a different fuel consumption rate range. The fuel consumption rate range for each of the plurality of burner stages is maintained within 5-10% of the maximum fuel consumption rate for the fuel consumption rate range.

In some implementations of the second aspect of the disclosure, a temperature of the hot water produced by the hot water heater increases throughout each of the burner stages.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used.

For example, "A, B, and/or C" means "A", or "B", or "C", or "A and B", or "A and C", or "B and C", or "A and B and C".

Typically, tankless water heaters are manufactured with a coaxial air intake and exhaust vent to facilitate operation as a Category IV device. To reduce installation time and costs for a tankless water heater, a vent attachment is disclosed herein to facilitate attaching a coaxial air intake and exhaust vent of a tankless water heater to a Category I vent, such as B-vent, that may already be present at a residence or building. The vent attachment comprises a first end with a coaxial connector comprising a central exhaust pathway and a circumferential air intake pathway. The vent attachment also comprises a second end with a tubular exhaust vent connector in fluid communication with the central exhaust pathway. In various implementations, the exhaust vent connector has a larger diameter than the central exhaust pathway of the coaxial connector. The exhaust vent connector may be sized to be received by a Category I vent, such as B-vent. The vent attachment further comprises a frame that encloses the central exhaust pathway and comprises a mesh configured to provide fluid communication through the frame with the air intake pathway.

Accordingly, in use, the air intake pathway receives intake air for the tankless water heater from an environment surrounding the tankless water heater while the mesh filters the intake air to prevent intake of debris. At the same time, exhaust from the water heater may flow through the central exhaust pathway to the exhaust vent connector and on to an existing Category I vent at a residence or building. Therefore, using the vent attachment reduces installation time and costs by facilitating leveraging the existing Category I vent in the residence or building as opposed to requiring the installation of a new Category IV vent.

In addition to providing the vent attachment to facilitate the physical connection of the tankless water heater to the existing Category I vent, operation of the tankless water heater is modified to ensure that the exhaust generated is suitable for venting through a Category I vent. Where a typical tankless water heater would gradually decrease the fuel consumption rate (e.g. BTU/h) through each of a plurality of burner stages, the tankless water heater presented herein maintains the fuel consumption rate above a minimum fuel consumption rate for each burner stage. In some implementations, the fuel consumption rate is maintained above a mid-point between a minimum and maximum fuel consumption rate for each burner stage. By maintaining a higher fuel consumption rate at each burner stage, the flu gasses are maintained at a sufficiently high temperature to maintain Category I operation.

However, because the fuel consumption rate is maintained at a range of operation higher than typical, the range of water temperature produced by the hot water heater is also larger. For example, a typical water heater may produce hot water within +/−2 degrees F. of the set point temperature. However, with the tankless water heater presented herein, the produced water temperature may be within +/−10 degrees F. of the set point temperature. It would be undesirable to directly supply hot water with such large variations in water temperature directly to a plumbing network of a residence or building. However, in combination with a tank in a hybrid tankless water heater and tank system, the larger variations in water temperature have an opportunity to mix within the tank and supply an output temperature to a plumbing network at a typical range of +/−1-2 degrees F. of the set point temperature.

Figure 1A:
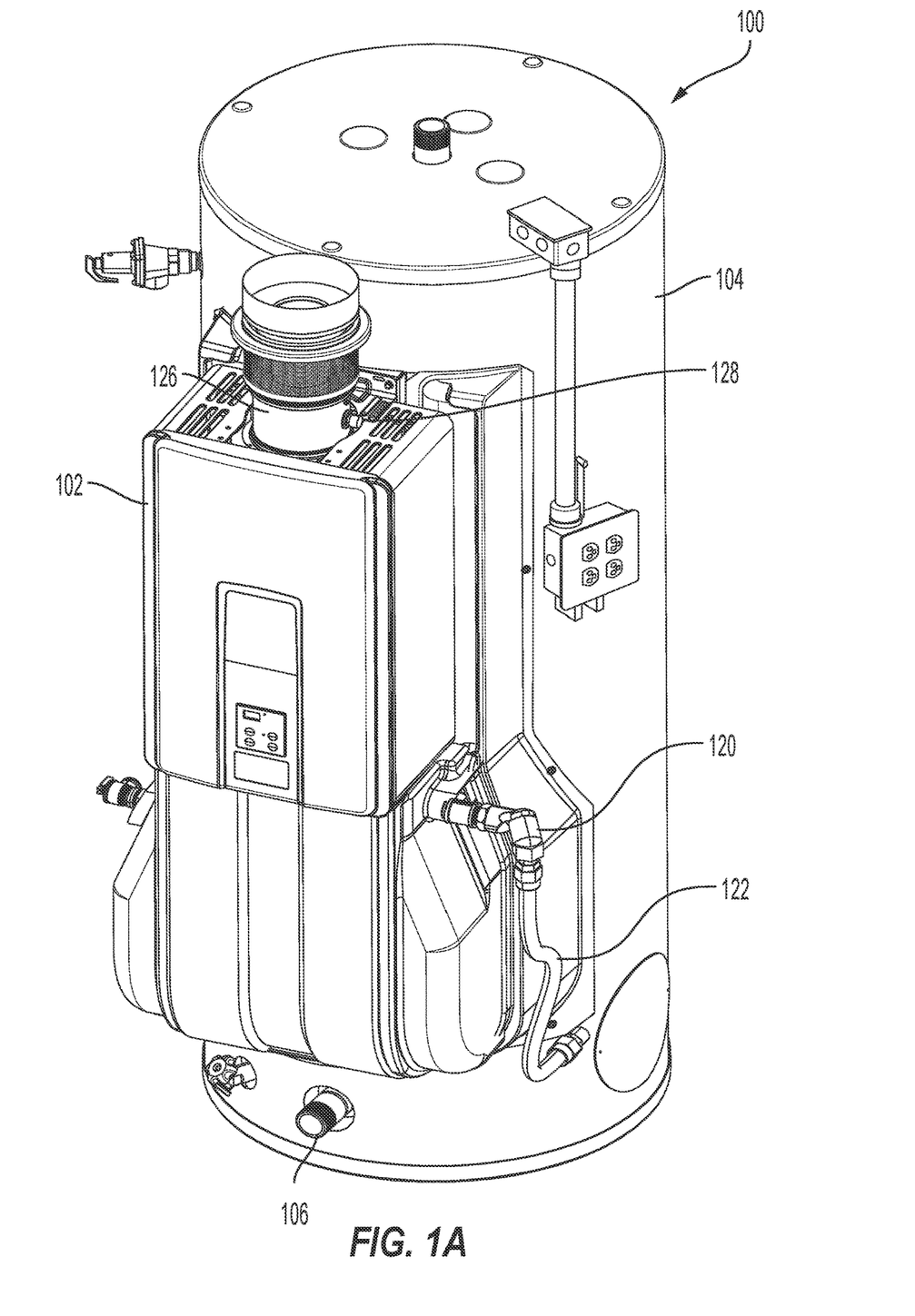
FIGS. 1A-1B are views of a hybrid tankless and tank water heating system suitable for implementing the several embodiments of the disclosure.
Figure 1B:
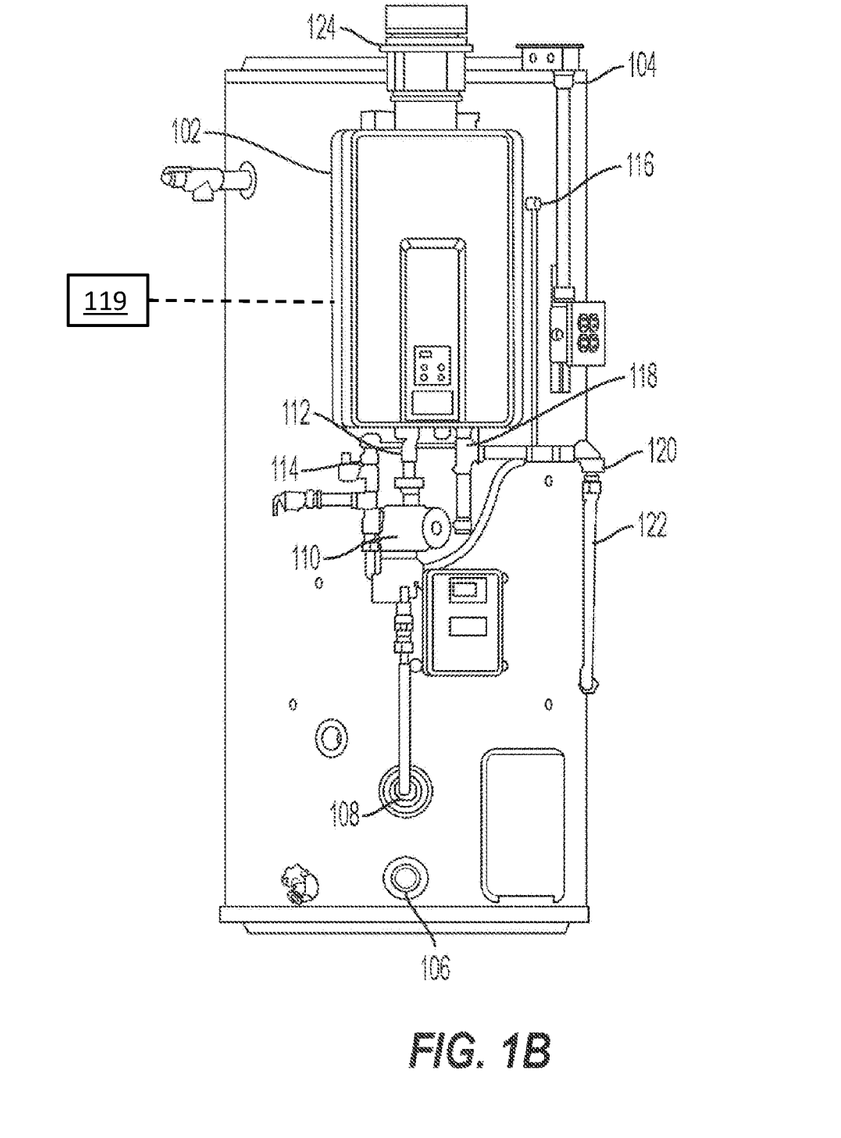

FIGS. 1A-1B are views of a hybrid tankless and tank water heating system 100 suitable for implementing the several embodiments of the disclosure. FIG. 1B shows the hybrid water heating system 100 with decorative cladding removed. The hybrid water heating system 100 includes a tankless water heater 102 and a hot water storage tank 104. The hot water storage tank 104 has a cold water inlet 106 for receiving cold water from a water supply source, such as a municipal water supply. The hot water storage tank 104 also has a cold water outlet 108 for supplying cold water maintained within the hot water storage tank 104 to the tankless water heater 102. The cold water outlet 108 is positioned above the cold water inlet 106 toward the bottom of the hot water storage tank 104. A recovery pump 110 is configured to pump water from the cold water outlet 108 of the hot water storage tank 104 to a cold water inlet 112 of the tankless water heater 102. Water circulated by the recovery pump 110 is heated by the tankless water heater 102 using one or more burners to supply hot water from a hot water outlet 114. Hot water is supplied from the hot water outlet 114 of the tankless water heater 102 to a hot water inlet 116 of the hot water storage tank 104. The hot water inlet 116 is positioned towards the top of the hot water storage tank 104. A hot water outlet (not shown) is positioned on a top surface of the hot water storage tank 104 to supply hot water from the hot water storage tank 104 to a plumbing network in a residence or building. A controller 119 is configured to control a fuel consumption rate of one or more burners of the tankless water heater through a plurality of burner stages as a temperature of hot water stored in the hot water storage tank increases.

Additionally, the tankless water heater 102 has a fuel inlet 118 for receiving fuel, such as natural gas or propane, for the burners to heat the circulated water. In some implementations, the fuel inlet 118 is coupled to a gas swivel 120. As shown in FIG. 1A, the gas swivel is plumbed to be located outside of the decorative cladding. The gas swivel 120 facilitates 360° rotation while maintaining a secure connection with the fuel inlet 118. A flex pipe 122 is attached to the gas swivel 120 and is configured to provide a flexible yet secure connection to the fuel inlet 118. Together, the gas swivel 120 and the flex pipe 122 facilitate ease of installation of a fuel source to the hybrid water heating system 100.

The tankless water heater 102 also has a coaxial air intake and exhaust vent 126 for receiving intake air and expelling exhaust. The coaxial air intake and exhaust vent 126 expels exhaust from a central exhaust pathway (not shown) and receives air from a circumferential air intake pathway (not shown). The coaxial air intake and exhaust vent 126 comprises a flue drain 128 for draining any condensation that may accumulate within the coaxial air intake and exhaust vent 126.

As shown, a vent attachment 124 is attached to the tankless water heater 102. As discussed above, the tankless water heater 102 comprises a coaxial intake air and exhaust port. As described in more detail below with reference to FIGS. 2 and 3, the vent attachment 124 facilitates connection of the coaxial intake air and exhaust port to a Category 1 vent, such as a B-vent. At the same time, the vent attachment 124 facilitates air intake from an ambient environment surrounding the hybrid water heating system 100 through a mesh frame.

Figure 2:
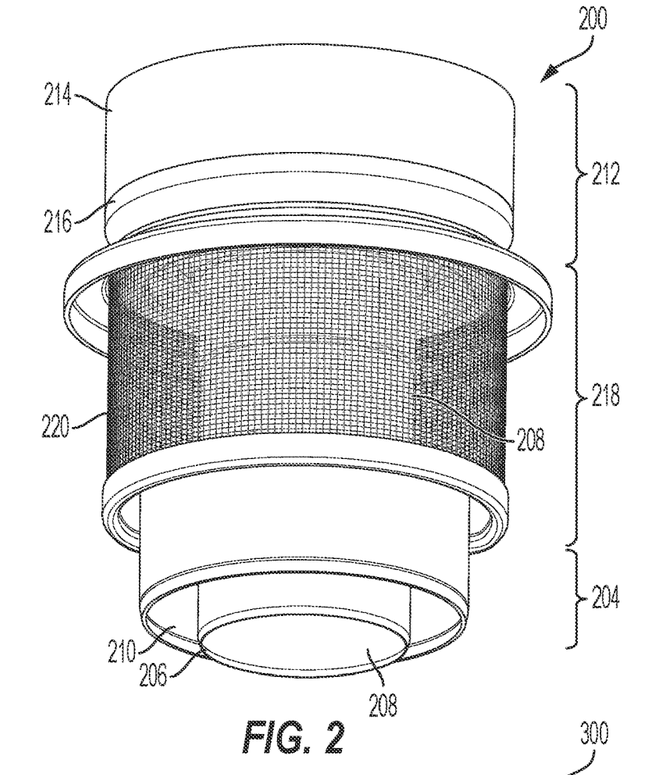
FIG. 2 is an embodiment of a vent attachment for the hybrid tankless and tank water heating system suitable for implementing the several embodiments of the disclosure.

FIG. 2 is an embodiment of a vent attachment 200 for the hybrid tankless and tank water heating system 100 suitable for implementing the several embodiments of the disclosure. For example, the vent attachment 200 may be used as the vent attachment 124, described above. The vent attachment 200 comprises a first end 204 with a coaxial connector 206 comprising a central exhaust pathway 208 and a circumferential air intake pathway 210. In some implementations, the central exhaust pathway 208 has a 3 inch diameter and the circumferential air intake pathway 210 has a 5 inch diameter.

The vent attachment 200 also comprises a second end 212 with a tubular exhaust vent connector 214 in fluid communication with the central exhaust pathway 208. In various implementations, the exhaust vent connector 214 has a larger diameter than the central exhaust pathway 208 of the coaxial connector. For example, the central exhaust pathway 208 may have a 3 inch diameter whereas the exhaust vent connector 214 has a 6 inch diameter. The exhaust vent connector 214 may be sized to be received by a Category I vent, such as B-vent. In some implementations, exhaust vent connector 214 may terminate with a flange 216 such that in use, a Category I vent may be installed over the exhaust vent connector 214 until abutting with the flange 216. The Category I vent may be secured to the exhaust vent connector 214 in any desirable manner, such as with one or more screws, adhesive, tape, clamps or any other suitable method of attaching a vent to a tube. The vent attachment 200 further comprises a frame 218 that encloses the central exhaust pathway 208 and comprises a mesh 220 configured to provide fluid communication through the frame 218 with the air intake pathway 210. In various implementations, the mesh 220 is #30 mesh, though other mesh sizes are contemplated by this disclosure.

In use, the air intake pathway 210 receives intake air for the tankless water heater 102 from an environment surrounding the tankless water heater 102 while the mesh 220 filters the intake air to prevent intake of debris. At the same time, exhaust from the water heater 102 may flow through the central exhaust pathway 208 to the exhaust vent connector 214 and on to an attached Category I vent at a residence or building. Therefore, using the vent attachment 200 reduces installation time and costs by facilitating leveraging the existing Category I vent in the residence or building as opposed to requiring the installation of a new Category IV vent.

Figure 3:
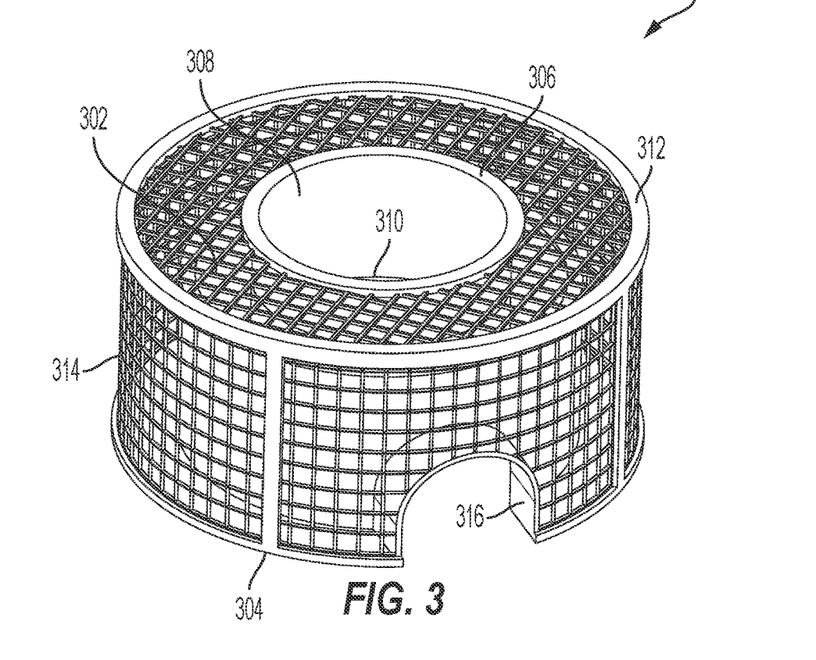
FIG. 3 is another embodiment of a vent attachment for the hybrid tankless and tank water heating system suitable for implementing the several embodiments of the disclosure.

FIG. 3 is another embodiment of a vent attachment 300 for the hybrid tankless and tank water heating system 100 suitable for implementing the several embodiments of the disclosure. For example, the vent attachment 300 may be used as the vent attachment 124, described above. The vent attachment 300 comprises a first end 304 with a coaxial connector comprising a central exhaust pathway (not shown) and a circumferential air intake pathway 302. In some implementations, the central exhaust pathway has a 3 inch diameter and the circumferential air intake pathway 302 has a 5 inch diameter.

The vent attachment 300 also comprises a second end 306 with a tubular exhaust vent connector 308 in fluid communication with the central exhaust pathway. In various implementations, the exhaust vent connector 308 has a larger diameter than the central exhaust pathway of the coaxial connector. For example, the central exhaust pathway may have a 3 inch diameter whereas the exhaust vent connector 308 has a 6-7 inch diameter. The exhaust vent connector 308 may be sized to receive a Category I vent, such as B-vent, within the exhaust vent connector 308. In some implementations, exhaust vent connector 308 may terminate with a flange 310 such that in use, a Category I vent may be installed in the exhaust vent connector 308 until abutting with the flange 310. The Category I vent may be secured to the exhaust vent connector 308 in any desirable manner, such as with one or more screws, adhesive, tape, clamps or any other suitable method of attaching a vent to a tube. The vent attachment 300 further comprises a frame 312 that encloses the central exhaust pathway and comprises a mesh 314 configured to provide fluid communication through the frame 312 with the air intake pathway 302. In various implementations, the mesh 314 is #30 mesh, though other mesh sizes are contemplated by this disclosure.

The frame 312 also comprises a drain access port 316 (e.g., "dog house" port) configured to provide access to the flue drain 128 when installed on the tankless water heater 102. The drain access port 316 extends through the frame 312 to facilitate access to the flue drain 128 without removing the vent attachment 300.

In use, the air intake pathway 302 receives intake air for the tankless water heater 102 from an environment surrounding the tankless water heater 102 while the mesh 314 filters the intake air to prevent intake of debris. At the same time, exhaust from the water heater 102 may flow through the central exhaust pathway to the exhaust vent connector 308 and on to an attached Category I vent at a residence or building. Therefore, using the vent attachment 300 reduces installation time and costs by facilitating leveraging the existing Category I vent in the residence or building as opposed to requiring the installation of a new Category IV vent.

Figure 4A:
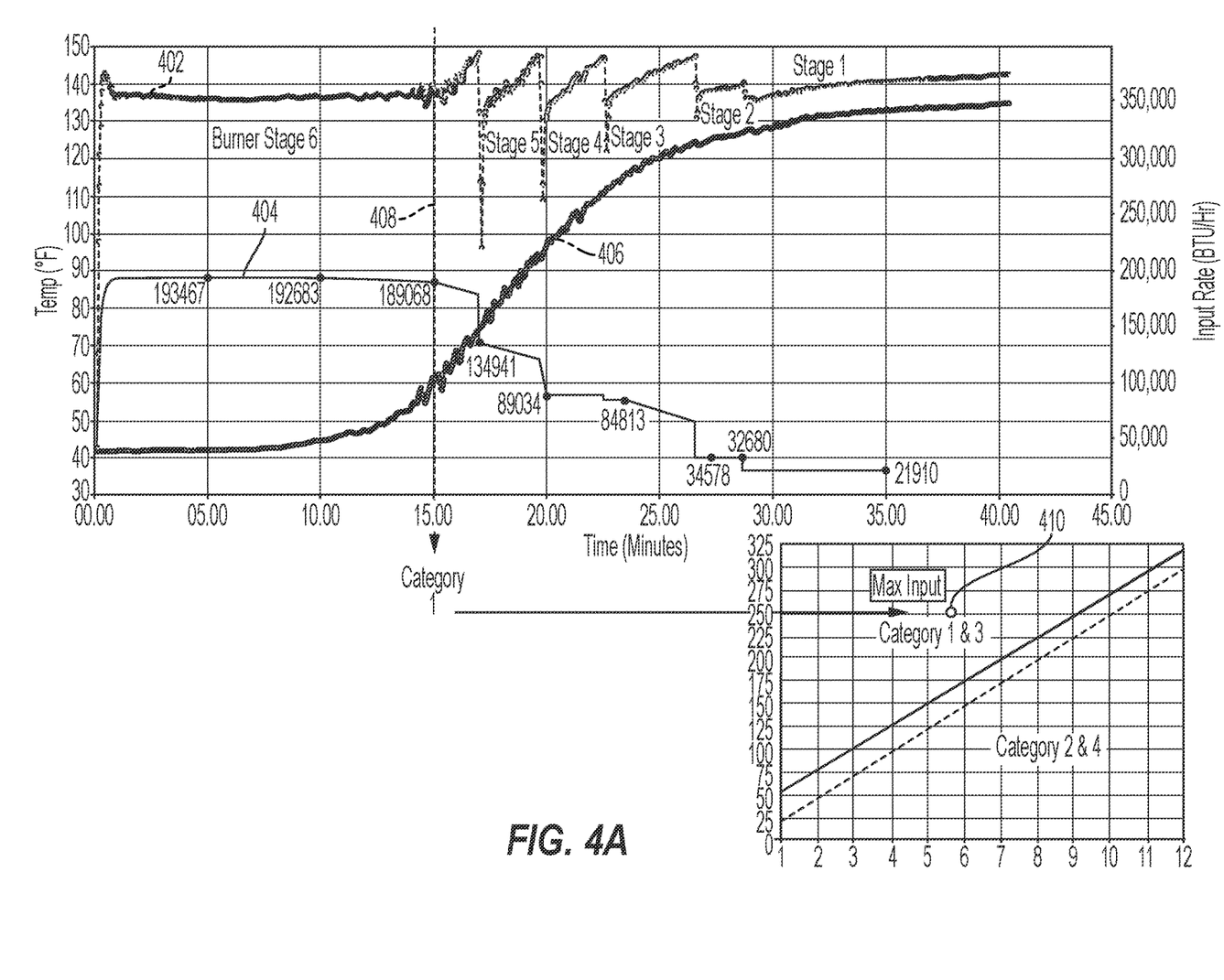
FIGS. 4A-4C are operational graphs of water heater output temperature, tank temperature, and BTU usage rates for maintaining Category I operations suitable for implementing the several embodiments of the disclosure.
Figure 4B:
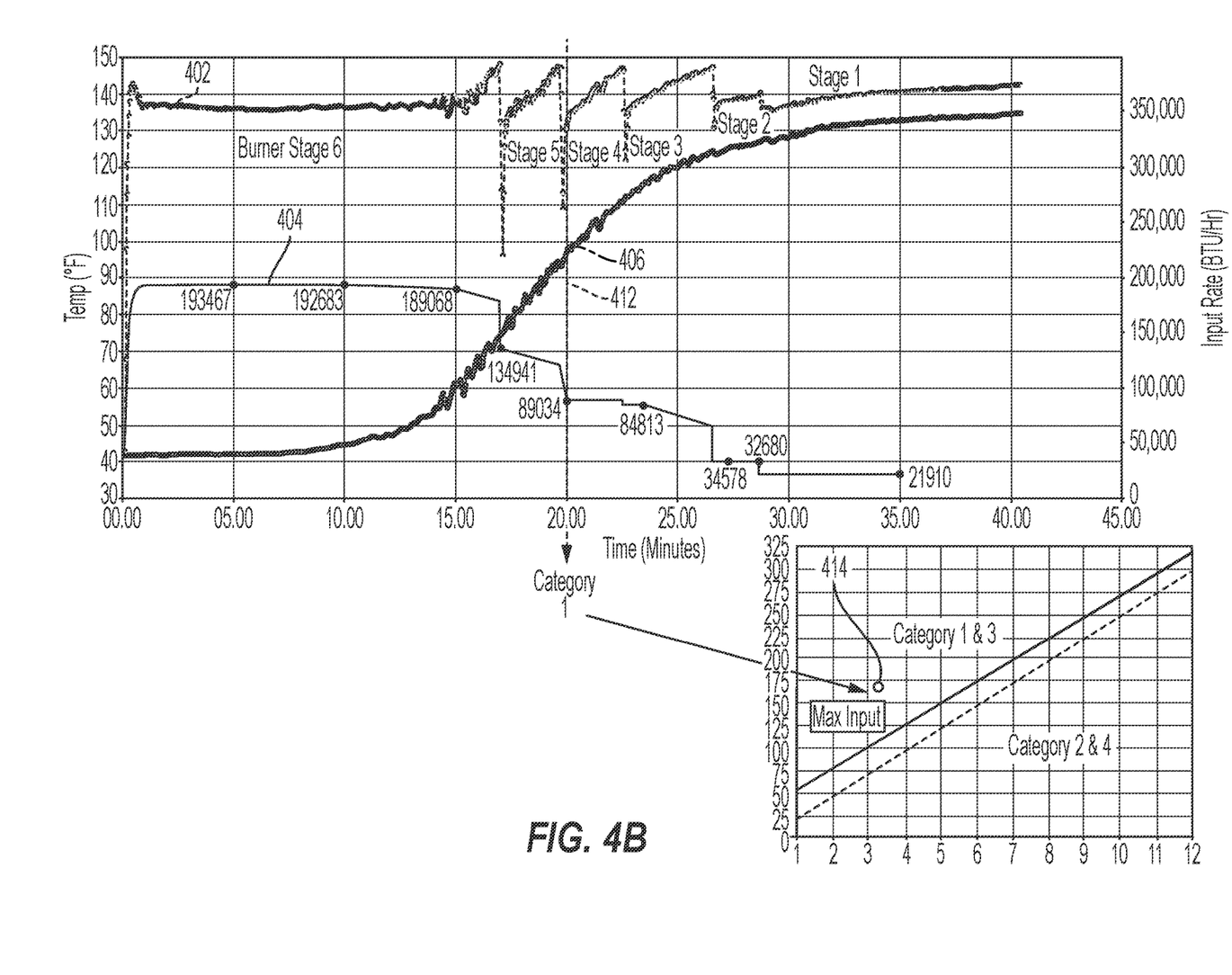
Figure 4C:
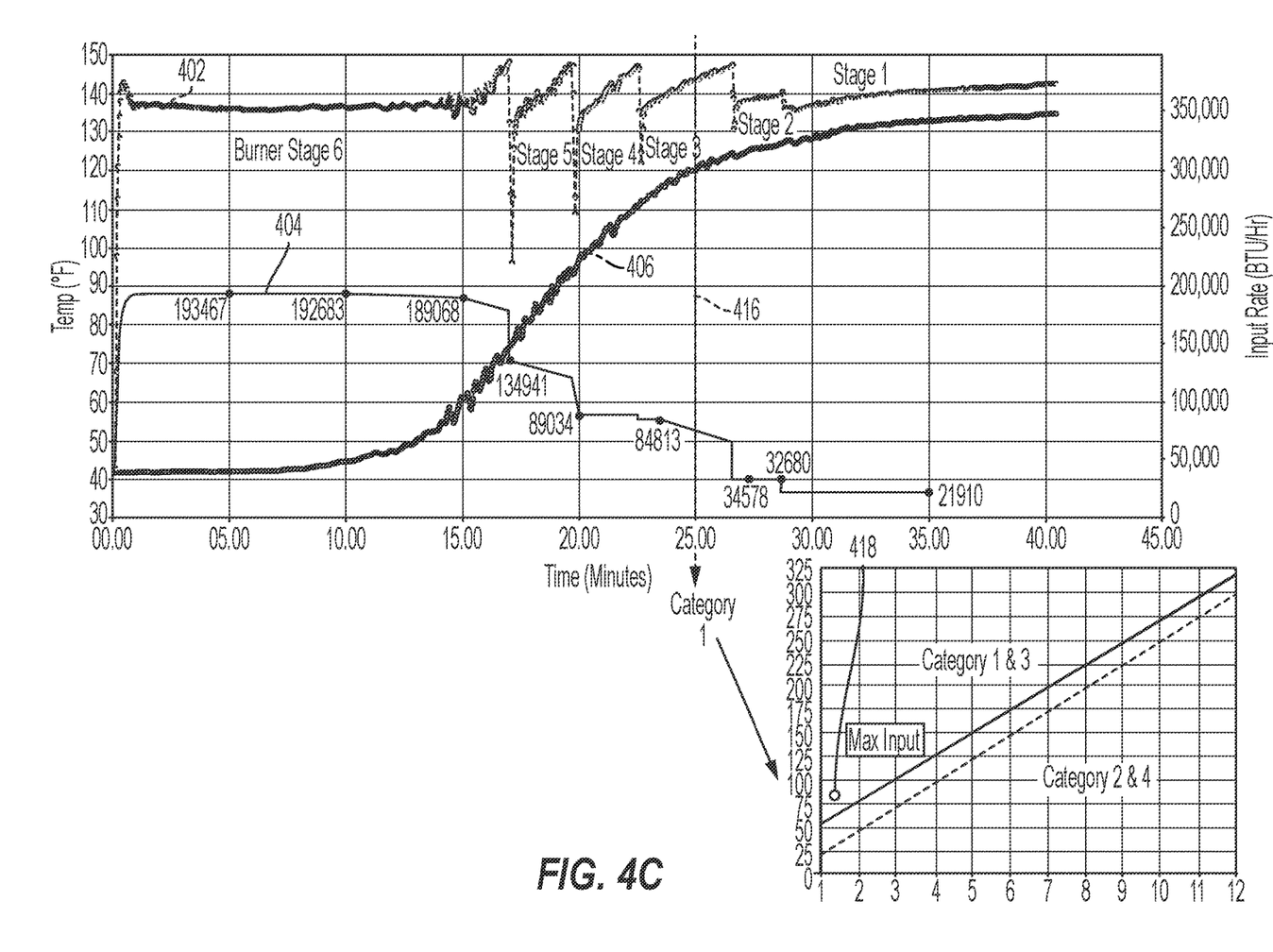

FIGS. 4A-4C are operational graphs of water heater output temperature, tank temperature, and BTU usage rates for maintaining Category I operation suitable for implementing the several embodiments of the disclosure. Each of the graphs show an output temperature 402 of the tankless water heater 102, a fuel consumption rate 404 (e.g., BTU/h), and a hot water storage tank temperature 406 over time. The graphs depict a recovery operation for heating water in the hot water storage tank 104 to a setpoint temperature. During the recovery operation, the tankless water heater 102 may operate in a plurality of burner stages to facilitate efficient operation. In the example shown, there are six burner stages. Each of the plurality of burner stages operates one or more burners with a different fuel consumption rate range. For example, burner stage 6 operates one or more burners of the hot water heater 102 within a first range of fuel consumption rates between a first maximum fuel consumption rate and a first minimum fuel consumption rate. Each successive burner stage has a lower range of operational fuel consumption rates. For example, burner stage 5 operates one or more burners of the hot water heater 102 within a second range of fuel consumption rates between a second maximum fuel consumption rate and a second minimum fuel consumption rate, where the second maximum fuel consumption rate is less than the first minimum fuel consumption rate of burner stage 6. Burner stages 4-1 likewise have successively lower ranges of fuel consumption rates.

Where a typical tankless water heater would gradually decrease the fuel consumption rate through each of a plurality of burner stages, the tankless water heater 102 maintains the fuel consumption rate above a typical minimum fuel consumption rate for each burner stage. In some implementations, the range of fuel consumption rates for each of the burner stages is above a mid-point between a typical minimum and maximum fuel consumption rate for each burner stage. In some implementations, the range of fuel consumption rates for each of the burner stages is maintained within 5-10% of the maximum fuel consumption range of the burner stage. By maintaining a higher fuel consumption rate at each burner stage, the flu gasses are maintained at a sufficiently high temperature to maintain Category I operation.

However, because the fuel consumption rate is maintained at a range of operation higher than typical, the range of water temperature produced by the hot water heater is also larger. For example, a typical water heater may produce hot water within +/−1-2 degrees F. of the set point temperature. However, with the tankless water heater 102, the produced water temperature may be within +/−1-10 degrees F. of the set point temperature.

For example, as shown in FIG. 4A, at a time period 408, a typical tankless water heater would steadily taper off the fuel consumption rate of the burner stage so as to maintain the output temperature 402 of the tankless water heater 102 close to the set point temperature (e.g., within 2 degrees). In contrast, as shown in FIG. 4A, the fuel consumption rate 404, while decreasing is maintained within about 5% of the maximum fuel consumption rate for the burner stage. As such, the output temperature 402 of the tankless water heater 102 steadily climbs during the time following the time period 408. Additionally, the flu gas temperatures are maintained within the Category I range as shown at 410. The tankless water heater 102 may continue to operate in the burner stage until the output temperature 402 of the tankless water heater 102 reaches a maximum output temperature (e.g., ten degrees above the set point temperature). Upon reaching the maximum output temperature, the tankless water heater 102 may continue operation in a successive burner stage. While the output temperature 402 of the tankless water heater 102 is over the set point temperature, due to mixing with cooler water within the hot water storage tank 104, the hot water storage tank temperature 406 steadily increases.

Likewise, as shown in FIG. 4B, at a time period 412, while using a lower fuel consumption rate, the output temperature 402 of the tankless water heater 102 steadily increases to the maximum output temperature. Therefore, the hot water storage tank temperature 406 continues to steadily increase. However, despite using a lower fuel consumption rate, the flu gas temperatures are maintained within the Category I range as shown at 414.

As shown in FIG. 4C, at time period 416, the tankless water heater 102 operates in a final burner stage (e.g., burner stage 1). In the final burner stage, the tankless water heater 102 operates at a minimal fuel consumption rate. As such, while the output temperature 402 gradually increases over time, the rate of increase is smaller than in the earlier burner stages. Additionally, despite using a minimal fuel consumption rate, the flu gas temperatures are maintained within the Category I range as shown at 418.

It would be undesirable to directly supply hot water with such large variations in water temperature directly to a plumbing network of a residence or building. However, in combination with a tank in a hybrid tankless water heater and tank system, the larger variations in water temperature have an opportunity to mix within the tank and supply an output temperature to a plumbing network at a typical range of +/−1-2 degrees F. of the set point temperature.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A hybrid tank and tankless water heating system, comprising:
   a tankless water heater configured to produce hot water;
   a hot water storage tank in fluid communication with the tankless water heater and configured to receive the hot water produced by the tankless water heater; and
   a controller configured to control a fuel consumption rate of one or more burners of the tankless water heater though a plurality of burner stages as a temperature of hot water stored in the hot water storage tank increases, wherein each of the burner stages operates the one or more burners at a different fuel consumption rate range, and wherein the fuel consumption rate range for each of the plurality of burner stages is maintained within 5-10% of the maximum fuel consumption rate for the fuel consumption rate range.

2. The system of claim 1, wherein a temperature of the hot water produced by the hot water heater increases throughout each of the burner stages.

3. The system of claim 2, wherein the tankless water heater is configured to produce the hot water with Category I operation.

4. The system of claim 2, wherein the tankless water heater is configured to produce the hot water to within +/−10 degrees Fahrenheit of a set point temperature.

5. The system of claim 1, wherein the tankless water heater is configured to produce the hot water to within +/−10 degrees Fahrenheit of a set point temperature.

* * * * *